United States Patent
Yu (10) Patent No.: US 7,671,789 B1
(45) Date of Patent: Mar. 2, 2010

(54) METHOD AND SYSTEM FOR TARGET DETECTION AND ANGLE ESTIMATION BASED ON A RADAR SIGNAL

(75) Inventor: Kai-Bor Yu, Niskayuna, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 12/245,381

(22) Filed: Oct. 3, 2008

(51) Int. Cl.
  *G01S 13/44* (2006.01)
(52) U.S. Cl. .................. 342/152; 342/194; 342/80
(58) Field of Classification Search ............ 342/149, 342/152, 189, 194–195, 80
  See application file for complete search history.

(56) References Cited

U.S. PATENT DOCUMENTS

| | | | | |
|---|---|---|---|---|
| 5,371,506 | A * | 12/1994 | Yu et al. ............. | 342/380 |
| 5,600,326 | A * | 2/1997 | Yu et al. ............. | 342/17 |
| 6,313,794 | B1 * | 11/2001 | Rose ................. | 342/424 |
| 6,404,379 | B1 | 6/2002 | Yu et al. | |
| 6,531,976 | B1 * | 3/2003 | Yu ................... | 342/16 |
| 6,598,014 | B1 * | 7/2003 | Rabideau et al. ....... | 702/194 |
| 6,759,981 | B1 * | 7/2004 | Krikorian et al. ...... | 342/424 |
| 6,819,282 | B1 * | 11/2004 | Galati et al. ......... | 342/37 |
| 6,867,726 | B1 * | 3/2005 | Yu et al. ............. | 342/17 |
| 7,212,149 | B2 * | 5/2007 | Abatzoglou et al. ..... | 342/25 F |
| 7,474,258 | B1 * | 1/2009 | Arikan et al. ......... | 342/159 |
| 7,576,682 | B1 * | 8/2009 | Yu ................... | 342/90 |
| 7,586,436 | B2 * | 9/2009 | Wakayama et al. ...... | 342/147 |

FOREIGN PATENT DOCUMENTS

| | | | |
|---|---|---|---|
| EP | 1167994 | A2 * | 1/2002 |
| EP | 1267444 | A2 * | 12/2002 |
| EP | 1348978 | A1 * | 10/2003 |
| JP | 2002243824 | A * | 8/2002 |
| JP | 2002257929 | A * | 9/2002 |

OTHER PUBLICATIONS

E. Kelly et al., "The Detection of Radar Echoes In Noise II", J. Soc. Indust. Appl. Math., vol. 8, No. 3, Sep. 1960, pp. 481-507.
R. Davis et al., "A Maximum-Likelihood Beamspace Processor for Improved Search and Track", IEEE Transactions on Antennas and Propagations, vol. 49, No. 7, Jul. 2001, pp. 1043-1053.

* cited by examiner

*Primary Examiner*—John B Sotomayor
(74) *Attorney, Agent, or Firm*—Howard IP Law Group PC (57) ABSTRACT

A method for target detection and angle estimation in a radar system includes receiving a signal from a radar array; based on the received signal, performing monopulse beamforming to obtain one or more monopulse beams; based on the monopulse beams, determining monopulse ratios; using maximum likelihood estimation based on the determined monopulse ratios to determine a monopulse ratio estimate corresponding to a maximum of a likelihood function; accessing a table correlating monopulse ratio estimates and target angle values and determining from the table an estimated target angle; accessing a complex target amplitude corresponding to the estimated target angle, comparing the complex target amplitude to a threshold; and if, based on the step of comparing, the target amplitude exceeds the threshold, providing an output signal indicative of target detection and the estimated target angle.

14 Claims, 6 Drawing Sheets

METHOD AND SYSTEM FOR TARGET DETECTION AND ANGLE ESTIMATION BASED ON A RADAR SIGNAL

FIELD OF INVENTION

The present invention relates to radar systems, and particularly to processing of radar signals to detect targets and estimate angles of targets for surveillance and tracking radars.

BACKGROUND OF THE INVENTION

Figure 1:
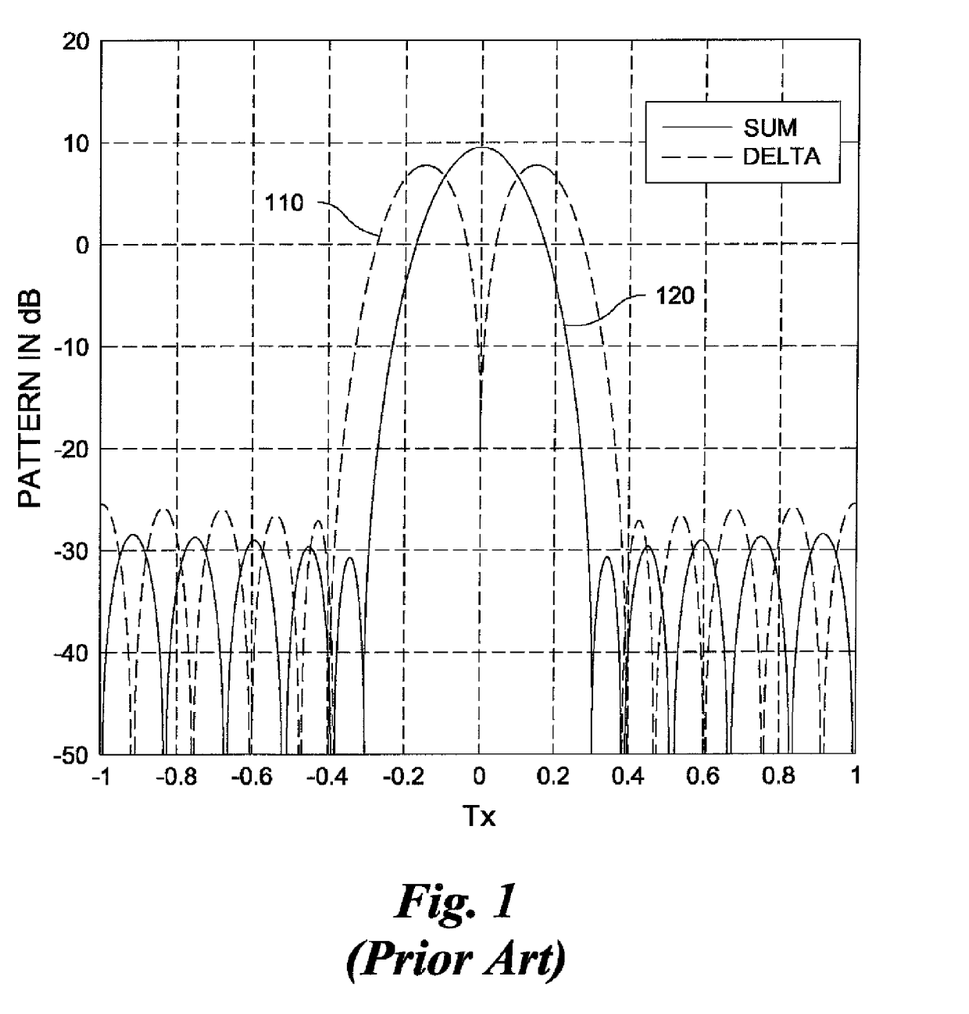
FIG. 1 illustrates a plot of the sum and delta beams of an exemplary signal from a radar array according to the prior art.

A monopulse antenna system for search and tracking radars includes a plurality of antenna elements designed to receive a signal from a target. In a typical monopulse antenna system, one beam is formed in transmission for search in a specified direction and two or more beams are formed on reception for target detection and angle estimation. A processing schema referred to a maximum-likelihood (ML) target detection and angle estimation makes it possible to reduce or eliminate the beam-shape loss in the received beam thus providing better detection performance and angle estimation accuracy over a large surveillance volume when compared to conventional schema. The plurality of associated antenna elements that define the received beam serve as input to a beamformer which forms various relationships such as: the target detection signal or sum signal $r_\Sigma=(I+II+III+IV)$; an azimuth difference signal $r_{A_{Az}}=(I+IV)-(II+III)$; and an elevation difference signal $r_{A_{El}}=(I+II)-(III+IV)$. FIG. 1 illustrates a plot of the sum and delta beams according to the prior art. In the presence of a target as detected from the sum beam, the elevation difference signal is divided by the sum signal to generate a value to determine the elevation angle of the target, and the azimuth difference signal is divided by the sum signal to generate a value to determine the azimuth angle of the target. The quotients of the division are applied to look up tables in order to determine the corresponding angular location within an antenna beam (see, U.S. Pat. No. 6,404,379, Yu, et al, incorporated herein by reference for a complete explanation of the foregoing monopulse reception scheme).

Technology currently exists to achieve digital beamforming (DBF) at the element or at the sub-array level that serves to provide flexibility in forming multiple received beams, e.g., highly overlapped or squinted sum beams. In this context, maximum-likelihood (ML) estimation schemes have been formulated at the element, the sub-array level and at the beam level.

The ML estimation process entails performing a search over all possible direction of arrival (DOA) of a target return and selecting the direction with a beam weight vector that yields the highest probability of declaring a target to be present. The search can be conducted within a region which is slightly larger then the 3 dB beamwidth of the transmit beam as depicted in FIG. 1. An independent beam search can be performed in every range cell within the range sweep. Thus there will be a set of optimum weights one for each range cell. ML estimation schemes applied at the element level, the sub-array level or beam level require storage of the element pattern or the sub-array pattern or the overlapped sum beam pattern over the beamwidth. Also, an iterative search or a grid search is required for locating the peak of the likelihood function. The ML estimation approach for target detection and angle estimation has a number of advantages (see, E. Kelly, I. Reed and W. Root, "The detection of radar echoes in noise II," J. Soc. Ind. Appl. Math, vol. 8, pp. 481-510, September 1960).

ML searches over a few beams have been advocated for reducing the computational burden. This approach is called maximum-likelihood beam-space processing (MLBP) (see, R. M Davies and R. L. Fante, "A Maximum-Likelihood Beamspace Processor for Improved Search and Track," IEEE Trans. Antennas & Propagation, vol. 49, No. 7, July 2001, pp. 1043-1053). This approach also reduces the probability of being stuck in local minima. The MLBP approach divides an antenna into a number of subarrays and digitizes their outputs. The digital signals are then processed in two stages wherein during the first stage the element or sub-array measurements are multiplied by sets of complex weights and summed to form a number of highly overlapped sum beams. The centers of these beams are all within the beamwidth of the transmit beam. During the second stage of processing the beams are weighted and combined to form a single output beam. The beam weights are then chosen to maximize the likelihood of detecting a target return.

MLBP eliminates beam shape loss on receive and increases the volume of space that can be searched for a given number of transmissions. This advantage provides the radar with additional time and energy to perform other functions. The MLBP architecture supports improved angle estimation accuracy compared to monopulse. The MLBP also supports angle estimation over a larger surveillance volume than monopulse. However, there is an increase in demand in terms of both computational and storage requirements. The MLBP requires the beam pattern values of the overlapped beams or the elements or the sub-arrays. It also requires a substantial computational burden when searching over the beamwidth using iterative search or exhaustive grid search methods.

Figure 2:
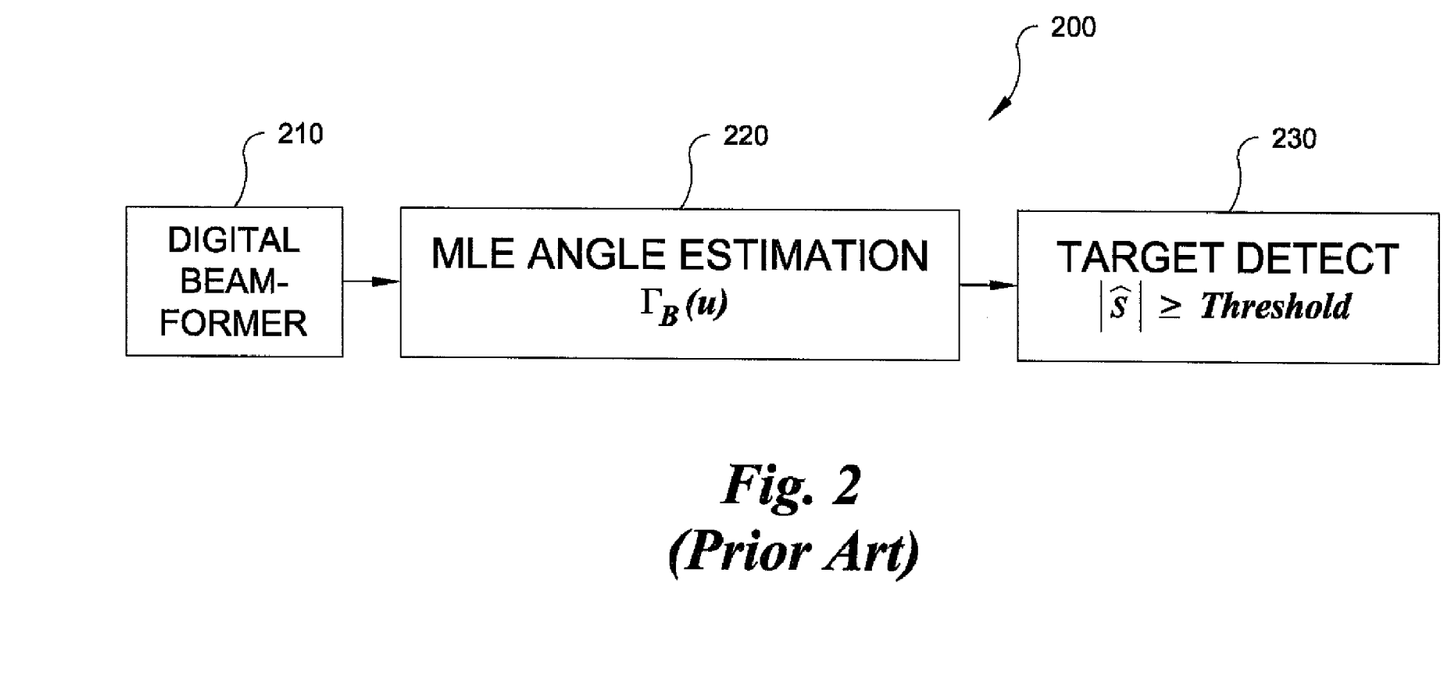
FIG. 2 illustrates a process flow diagram of a maximum-likelihood detection and angle estimation process flow according to the prior art.

The implementation of a maximum-likelihood target detection and angle estimation in accordance with the present invention can be understood by reference to FIG. 2. Process 200 refers to as element-based or subarray-based ML, whereby digital beamformer (DBF) 210 at the at the element or at the sub-array level creates: $g_B^H(u)=1\times N$ vector of the antenna beam patterns depending on directional cosine u whereby H denotes the complex conjugate transpose; $R_B$=covariance matrix of the set of cluster beams in the form of measurements of the variances plus the correlation measurement; and $r_B$=the measurement of the sum beams. The MLE Angle Estimator 220 computes the likelihood function in accordance with Equation 1 as follows:

$$\Gamma_B(u) = \frac{|g_B^H(u)R_B^{-1}r_B|^2}{g_B^H(u)R_B^{-1}g_B(u)} \quad (1)$$

Where:

$\Gamma_B(u)$=Maximum likelihood target parameter estimator

Again referring to FIG. 2, using essentially the same variables as use in the computation of $\Gamma_B(u)$, a target detection step 230 computes "ŝ" the complex target amplitude and compares the absolute value of "s" to a threshold value to determine if a target has been detected. Equation 2 states:

$$\hat{S} = \frac{g_B^H(\hat{u})R_B^{-1}r_B}{g_B^H(\hat{u})R_B^{-1}g_B(\hat{u})} \quad (2)$$

One approach to finding an approximate solution is to hypothesize a dense grid over angle "u" within the main beam receiving antenna pattern and evaluate the $\Gamma_B(u)$ at each location and then choose the angle that corresponds to the maximum. Typically, with this approach a large number of angular locations are required to achieve the desired accuracy. Consequently the grid search implementation is computationally expensive. The requirements for the foregoing prior art element-based or beam-based ML estimation approach are: (a) a storage requirement where all the cluster beam pattern values within the beamwidth with sampling of "u" are sufficiently high for accuracy requirements (the number of storage points is given by: (2× beamwidth/accuracy requirement)); and (b) a computational capacity that performs an iterative search for the maximum with sufficient accuracy or evaluates $\Gamma_B(u)$ at each location and then choose the angle that corresponds to the maximum in over a grid of points with sufficient accuracy. In this prior art beam-based ML estimation approach there are several impediments to the element-based or subarray-based procedure: (1) computational burden, (2) becoming stuck in a local minimum, and (3) excessive storage requirements of all the element or subarray patterns within the beamwidth. As mentioned above, maximum-likelihood beam-space processing (MLBP), which is essentially an ML search over a few beams, has been advocated for reducing the computational burden. This approach reduces the probability of getting stuck in local minima. It has lesser storage requirements, i.e., M beam patterns instead of N element patterns. However, what is needed is an efficient target detection and angle estimation scheme without requiring extensive searching and excessive storage requirement of antenna patterns. The prior art solutions require exhaustive grid search or iterative search over several beams.

SUMMARY OF THE INVENTION

In one embodiment, the invention herein relates to a computer-implemented method for target detection and angle estimation in a radar system, comprising: (a) receiving a signal from a radar array; (b) based on the received signal, performing monopulse beamforming to obtain one or more monopulse beams; (c) based on the monopulse beams, determining monopulse ratios; (d) using maximum likelihood estimation based on the determined monopulse ratios to determine an estimated monopulse ratio corresponding to a maximum of a likelihood function; accessing a table correlating monopulse ratio estimates and corresponding angle values and determining from the table the estimated target angle having a value closest to the monopulse ratio measurement estimate; (f) accessing the complex target amplitude corresponding to the angle estimation, (g) and comparing the target amplitude associated with the angle estimation to a threshold; and (h) if, based on the step of comparing, the target amplitude exceeds the threshold, providing an output signal indicative of target detection and the estimated target angle.

In an Embodiment, an Apparatus for Providing Target Detection and Estimated angle signal includes a memory device and a processor in communication with the memory device, for executing the steps of: based on monopulse beam data, determining monopulse ratios; using maximum likelihood estimation based on the determined monopulse ratios to determine a monopulse ratio estimate corresponding to a maximum of a likelihood function; accessing a table correlating estimated monopulse ratios and corresponding estimated target angle values and determining from the table the estimated target angle having a value best corresponding to the estimated monopulse ratio; accessing a complex target amplitude corresponding to the determined estimated target angle; comparing the complex target amplitude corresponding to the determined estimated target angle to a threshold; and if, based on the step of comparing, the target amplitude exceeds the threshold, providing an output signal indicative of target detection and the estimated target angle.

In an embodiment, a radar system has (a) a beamformer for supplying sum beam and difference beam signals; and (b) a processor for: (1) receiving the signals; (2) computing monopulse ratios of the sum and difference beams; (3) computing, employing maximum likelihood estimation, a monopulse ratio estimate based on the monopulse ratio measurements; (4) accessing a data storage that associates the monopulse ratio estimate with a corresponding estimated angle value; (5) accessing a complex target amplitude corresponding to the estimated angle value; (6) comparing the complex target amplitude associated with the estimated target angle to a threshold to determine if a target is present; and (7) providing an output signal indicative of the estimated target angle if a target is determined to be present.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is not intended to limit the invention or its application.

Figure 3:
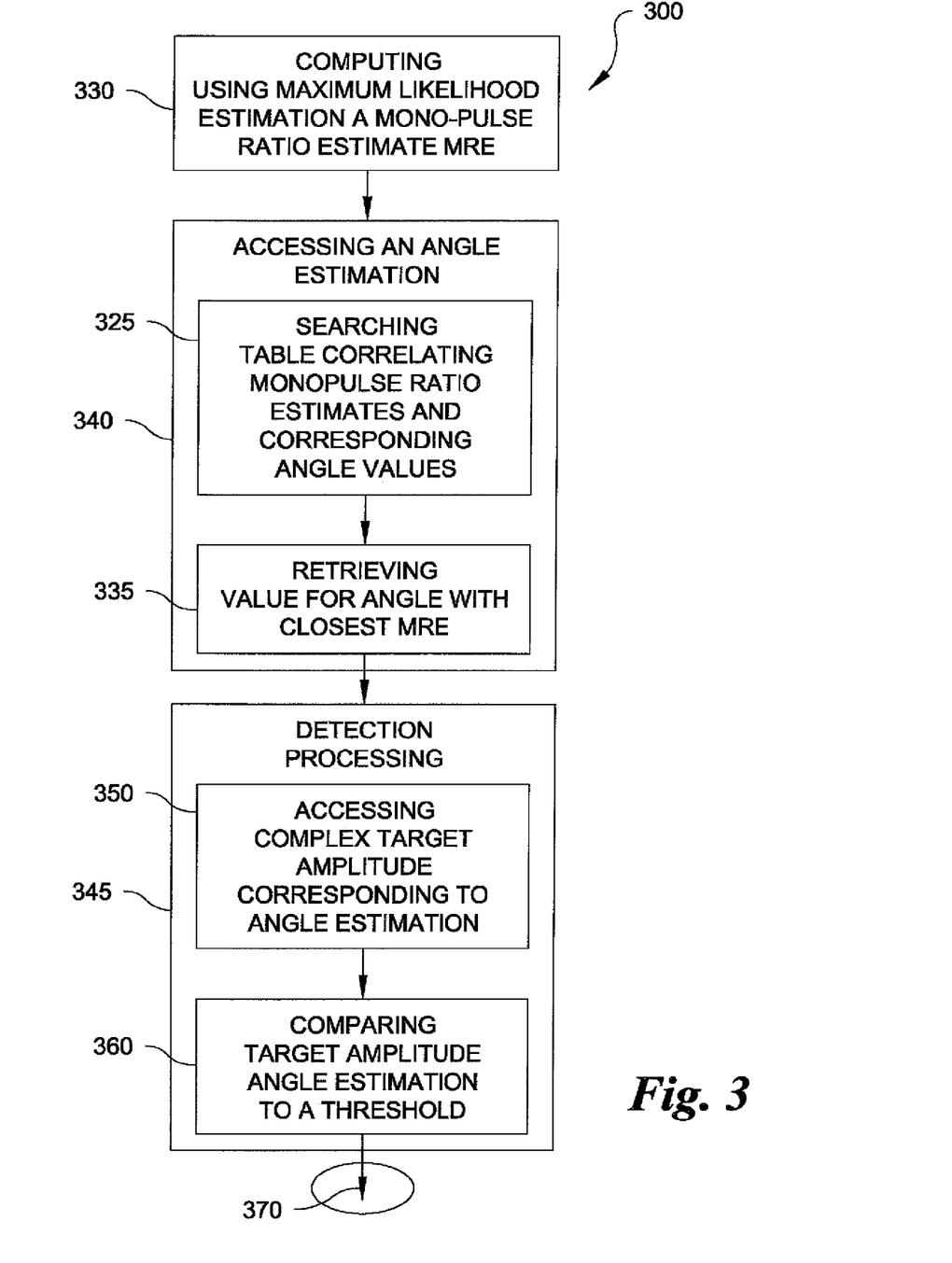
FIG. 3 illustrates a process flow diagram of a maximum-likelihood detection and angle estimation method according to an embodiment of the invention.

The present invention relates, in an embodiment, to target detection and angle estimation in radar systems. FIG. 3 depicts a process in accordance for target detection and angle estimation based on receiving monopulse ratio data. The received monopulse ratio data may be generated based on monopulse beams generated by a beamformer. FIG. 3 depicts a process 300 in accordance with an embodiment of the invention comprising: (a) computing 330, based on received monopulse ratio data, using maximum likelihood estimation, a monopulse ratio estimate; (b) accessing 340 a value for angle estimation by searching 325 a table having monopulse ratio estimates to find a monopulse ratio estimate that is closest to, or the best value corresponding to, the monopulse ratio estimate determined in step 330, and retrieving 335 an angle value corresponding to the closest monopulse ratio estimate determined in step 330; (c) detection processing 345 including (1) accessing 350 a complex target amplitude corresponding to the estimated angle, and (2) comparing 360 the target amplitude of the estimated angle to a threshold to provide, if the amplitude exceeds the threshold, an output indicative of the estimated angle and target detection 370. In one embodiment accessing 340 a value for angle estimation includes searching 325 in data storage for a monopulse ratio value that is the closest to the estimated monopulse ratio and retrieving 335 a value for angle estimation from a database. In another embodiment accessing 340 a value for angle estimation may be derived by a computation based upon a formula in terms of monopulse ratio values.

The present invention also relates, in an embodiment, to an apparatus including: a first processor that receives a signal including monopulse ratios derived from data from a radar array antenna to compute, based on maximum likelihood processing, a monopulse ratio estimate, a second processor to access a value for angle estimation, which in one embodiment includes the second processor searching a database correlating monopulse ratios and angle estimates to identify a monopulse ratio that is closest to or a best match for the monopulse ratio estimate, and retrieving the value for angle estimation corresponding to the identified monopulse ratio from the database; a third processor to access complex target amplitude corresponding to the angle estimation, and a fourth processor to compare the target amplitude of the angle estimation to a threshold to provide a maximum-likelihood target detection and angle estimation.

It should be understood that computing 330 a monopulse ratio estimate of FIG. 3 may have as input, signals from one or more types of monopulse signal generating antenna, such as the array type, in which a beamformer generates the desired beams directly, so long as they produce the sum signals and azimuth and elevation difference signals. As previously indicated, the sum signal, and the azimuth and elevation difference signals are used to determine the location of a target. In particular, for single target angle estimation, the azimuth and elevation angles can be determined by first forming the azimuth and elevation monopulse ratios using the conventional sum, azimuth difference and elevation difference beams given by the Equation 3a, 3b, respectively as follows:

$$M_{El} = \frac{r_{\Delta_{El}}}{r_\Sigma} \quad (3a)$$

$$M_{AZ} = \frac{r_{\Delta_{AZ}}}{r_\Sigma} \quad (3b)$$

The monopulse ratios are dimensionless numbers. The monopulse ratios with respect to angle off boresight can be read from a look up table.

Figure 4:
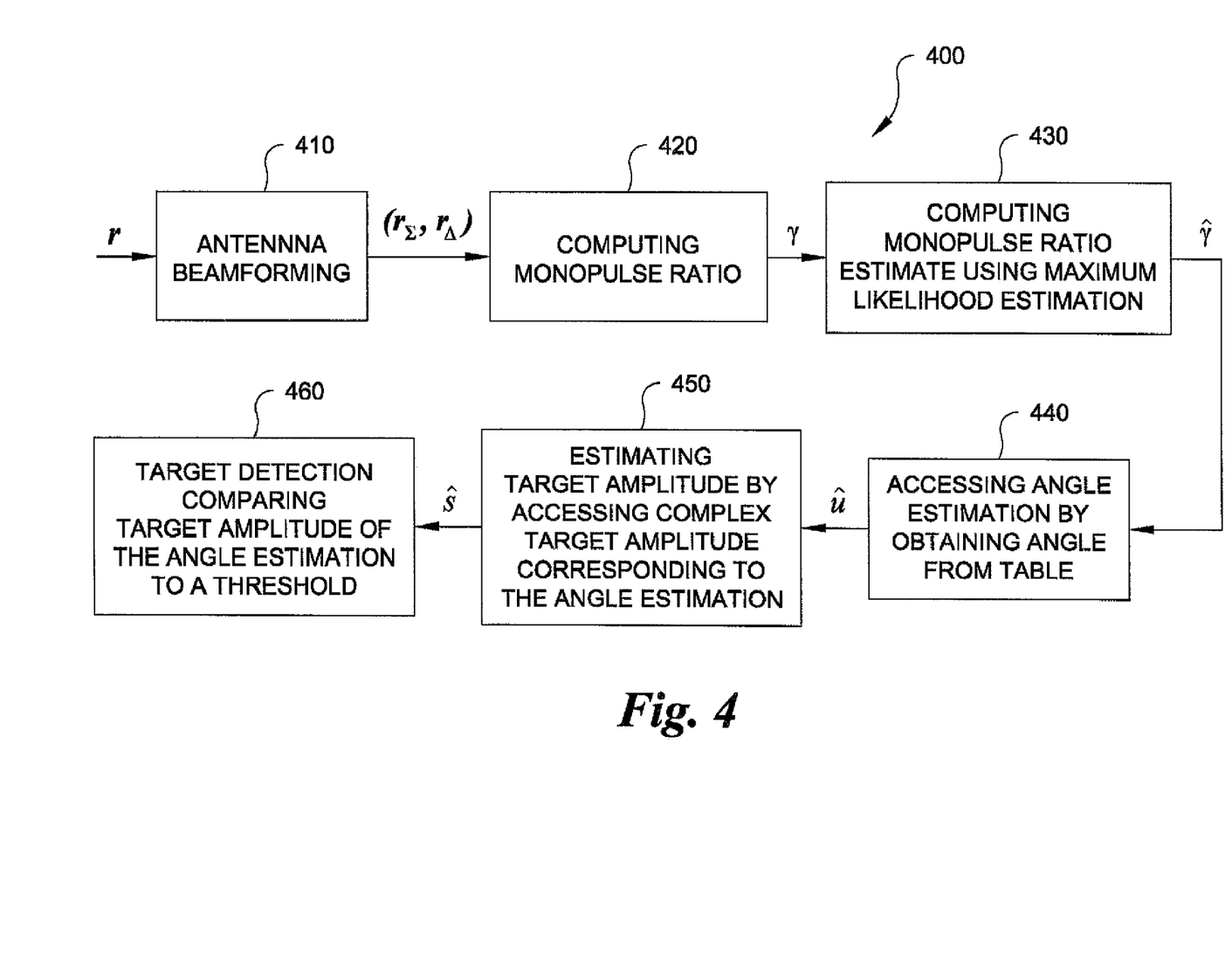
FIG. 4 illustrates a process flow diagram of the maximum-likelihood detection and angle estimation process flow according to an embodiment of the invention.

FIG. 4 is a process flow diagram illustrating a non-limiting embodiment of the inventive process 400 that forms 410 an analog or digital monopulse beam from a received signal r producing sum and difference signals $r_\Sigma$ and $r_\Delta$ and providing sum and difference antenna patterns $g_\Sigma(u)$ and $g_\Delta(u)$, respectively, where u is the angle, for each of the beams. An array antenna may have an output coupled to an input of a beamformer that provides the beams as an output. The step of forming a monopulse beam 410 may include forming beams as the sum and difference of the squinted beams or forming beams directly from the element measurements using appropriate sum and difference tapering coefficients. Both of these techniques are well known in the art. The process flow proceeds to computing 420 the azimuth and elevation monopulse ratios using the sum beam, azimuth difference beam and elevation difference beam provided as a result of the beamforming step 410. The computing step 420 may employ equations 3a and 3b. Computing 420 the monopulse ratio from the sum beam signal $r_\Sigma$ and the difference beam signal $r_\Delta$ yields γ for the monopulse ratio. The value γ serves as an input for computing a monopulse ratio estimate 430. A monopulse ratio estimate, as used herein, is a value of the monopulse ratio corresponding to an estimated target angle. The monopulse ratio estimate is computed using maximum likelihood estimation techniques, such as a maximizing likelihood function. An example of a likelihood function is the formula of Equation 4 to obtain $\Gamma_m$, which is the likelihood of a target, as a function of angle u, as follows:

$$\Gamma_m(u) = \frac{|r_\Sigma|^2}{\sigma_\Sigma^2} \frac{|1 + \beta f(u)\gamma|^2}{1 + \beta f^2(u)} \quad (4)$$

where:

$$f(u) = \frac{g_\Delta(u)}{g_\Sigma(u)} \quad \gamma = \frac{r_\Delta}{r_\Sigma} \quad \beta = \frac{\sigma_\Sigma^2}{\sigma_\Delta^2}$$

The variables $\sigma_\Sigma$ and $\sigma_\Delta$ represent the noise power level for the sum and difference beams, respectively. The set {$g_\Sigma(u)$, $g_\Delta(u)$} forms a 2×1 vector of sum and difference beam patterns depending on directional cosine u. The function f(u) represents a ratio of the difference beam pattern to the sum beam pattern. It will be appreciated that a calculation of Equation 4 directly would employ excessive processing resources.

Maximizing Equation 4 leads to an explicit expression of the monopulse ratio estimate in terms of monopulse ratio measurement and the ratio of the noise statistics of the sum and difference beams, leading to Equation 5:

$$\hat{\gamma} = f(u) = \frac{-(1 - \beta|\gamma|^2) + \sqrt{(1 - \beta|\gamma|^2)^2 + 4\beta\gamma_I^2}}{2\beta\gamma_I} \quad \text{Where:} \quad (5)$$

$$\gamma_I = \text{real }\{\gamma\} = \text{real }\left\{\frac{r_\Delta}{r_\Sigma}\right\}$$

The value $\hat{\gamma}$ associates the monopulse ratio function's f(u) value (the ratio of the antenna patterns as a function of angle) corresponding to the angle estimations for azimuth or elevation. The accessing angle estimation step 440 in one embodiment includes utilizing a table that relates monopulse ratios to angles. The step of accessing the angle involves comparing the determined estimated monopulse ratio from step 330 to monopulse ratios in the table, and selecting the monopulse ratio from the table that is the closest to the determined estimated monopulse ratio. The closeness is equal to the difference between the monopulse ratio estimate from the measurement and the monopulse ratio value from the table. The angle that corresponds, according to the table, to the closest monopulse ratio, is then retrieved. The table may have a storage capacity for the entirety of the monopulse ratios corresponding to the angles within the beamwidth, with a desired degree of granularity. The table may also include monopulse ratios for angles at least slightly outside the beamwidth. The development of the look up table employed in step 440 is known to those of ordinary skill in the art. In an embodiment, the table may be developed by obtaining the delta beam antenna pattern and the sum beam antenna pattern, and then calculating the ratio of delta beam to the sum beam at angles sampled with a selected level of granularity, which may be fine granularity, within the beamwidth, or including at least a slight range of angles outside the beamwidth.

The result of the step 440 of accessing an estimated angle is a sine of the estimated angle û. A complex target amplitude estimate ŝ may be obtained based on the antenna patterns associated with the estimated angle, the sum beam, and noise values. In particular, the complex target amplitude estimate ŝ may be computed using Equation 6 as follows:

$$\hat{s} = \frac{r_\Sigma}{g_\Sigma(\hat{u})} \frac{1 + \beta f(\hat{u})\gamma}{1 + \beta f^2(\hat{u})} \qquad (6)$$

Target detection is then accomplished by comparing 460 the target amplitude with a threshold. The threshold may have been previously determined in view of noise statistics and desired or acceptable false-alarm rates. Those of ordinary skill in the art in the processing of radar signals are able to select one or more thresholds depending on such factors as desired false-alarm rates.

The processing requirements for the method described above with respect to FIG. 4 include a computational performance capability, required for step 430, that includes an explicit evaluation of the monopulse ratio estimate (equation 5) in terms of the monopulse ratio data and the noise power ratio. The computational requirements for step 440 include a searching and retrieving capability that finds the value of the angle with a corresponding monopulse ratio value closest to the monopulse ratio estimate.

The method of FIG. 4 exploits the delta-beam $r_\Delta$ for detection since as illustrated in FIG. 1, the delta-beam $r_\Delta$ has a wider beamwidth than the sum beam and higher gain than the sum beam for most of the beam. The detection signal "ŝ" is a complex target amplitude. The formula for ŝ employs both the I (in-phase) and Q (quadrature) components of the monopulse ratio.

Figure 5:
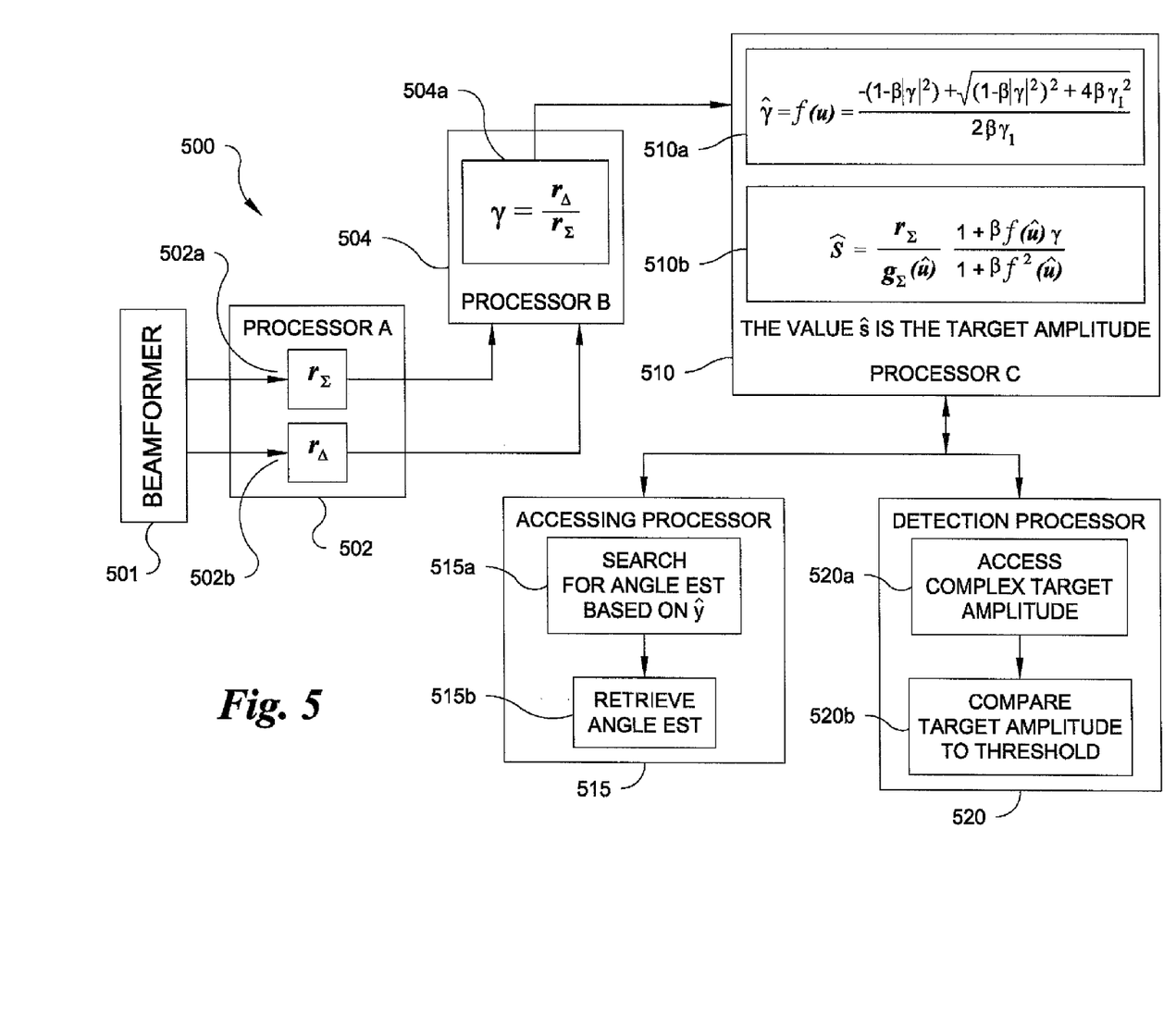
FIG. 5 illustrates an apparatus for maximum-likelihood target detection and angle estimation according to an embodiment of the invention.

As shown in FIG. 5, an apparatus 500 in accordance with an embodiment of the invention comprises one or more processors such as 502, 504, 510, 515 and 520 for obtaining an estimated angle and providing a target detection determination in accordance with the method described above with reference to FIGS. 3 and 4. Each processor may of course have associated memory devices and input/output devices. A beamformer 501 receives signals from an array antenna in the form of antenna element voltages, and provides outputs to a digital processor A 502, which generates sum beam measurement $r_\Sigma$502a and difference beam measurement $r_\Delta$502b. Respective outputs from processor A 502 form inputs to processor B 504 that calculates the monopulse ratio 504a, $$\gamma = \frac{r_\Delta}{r_\Sigma}$$

Processor C 510 receives the foregoing outputs from processor B 504. Processor 510 computes a monopulse ratio estimate 510a, using Equation (5), and furnishes the monopulse ratio estimate to accessing processor 515. Accessing processor 515 searches 515a a lookup table to determine a monopulse ratio closest to the monopulse ratio estimate. Accessing processor 515 then retrieves 515b the estimated angle corresponding to the selected monopulse ratio estimate. Accessing processor 515 then returns the estimated angle to processor C 510. Processor C 510 calculates a complex target amplitude 510b using Equation (6). Detection processor 520 accesses 520a the complex target amplitude. Detection processor 520 then compares 520b the magnitude of the complex target amplitude to a threshold. The processors of FIG. 5 may be digital processors executing instructions stored in digital storage media, or may be analog circuits, by way of example.

Figure 6:
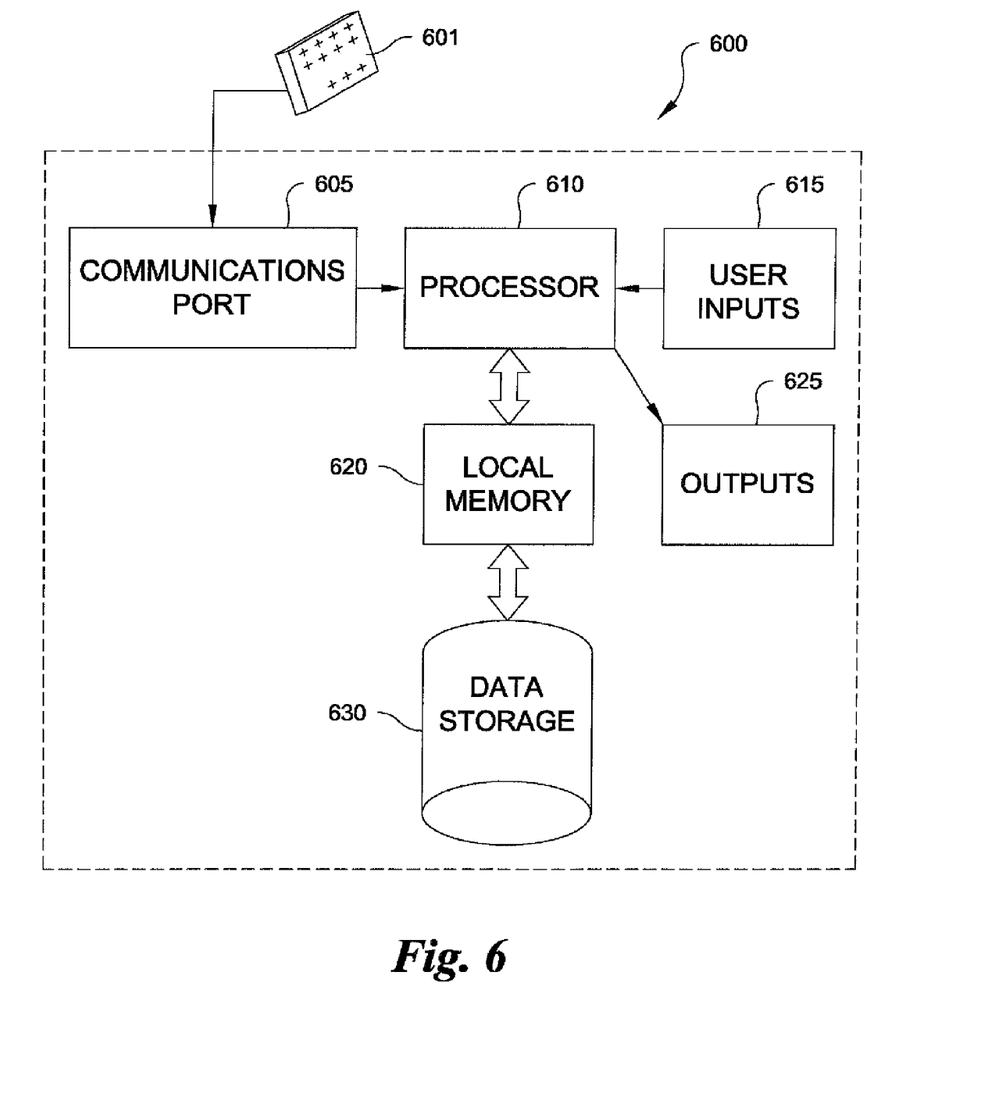
FIG. 6 illustrates a radar system for maximum-likelihood target detection and angle estimation according to an embodiment of the invention.

As shown in FIG. 6, an apparatus 600 in accordance with an embodiment of the invention comprises an array antenna 601 that transmits and receives radar signals and provides element voltage output signals. The signals serve as input to a communications port 605 that interfaces with a processor 610. Processor 610 is in communication with local memory 620 and data storage 630. The processor 610, local memory 620 and data storage 630 provide for beamforming, determining monopulse ratios, calculating an estimated monopulse ratio, accessing local memory 620 and/or data storage 630 to obtain an estimated angle by retrieving from a lookup table an angle corresponding to a monopulse ration closest to the calculated estimated monopulse ratio, determining a complex target amplitude, comparing the magnitude of the target amplitude to a threshold, and providing an output signal indicative of a target identification and target angle. User inputs 610 to the processor assists in operating the radar 600 as well as maintaining the data storage 630 that may include in its database the value for angle estimation. An output 625 may include displays, printers and other devices. An output signal from processor 610 may include target angle data and an indication of target detection, which data may be provided to output 625 and displayed for a user.

With reference to FIGS. 3, 4, 5, and 6, it is understood that the processing and associated processors used in any of the steps and methods illustrated in those figures, including determining the monopulse ratio estimate, identifying an estimated target angle best corresponding to the monopulse ratio estimate, determining the complex target amplitude corresponding to the estimated angle and comparing the magnitude of the complex target amplitude to a threshold to determine whether to output an indication of target detection, can be implemented in hardware, software, firmware, or combinations thereof. It is also to be appreciated that, where the functionality is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. Generally the software processes may exist in a variety of forms having elements that are more or less active or passive. For example, they may exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals are signals that a computer system hosting or running the computer program may be configured to access, including signals downloaded through the Internet or other networks. Examples of the foregoing include distribution of the program(s) on a CD ROM or via Internet download.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A computer-implemented method for target detection and angle estimation in a radar system, comprising:
    (a) receiving a signal from a radar array;
    (b) based on the received signal, performing monopulse beamforming to obtain one or more monopulse beams;
    (c) based on the monopulse beams, determining monopulse ratios;
    (d) using maximum likelihood estimation based on the determined monopulse ratios to determine an estimated monopulse ratio corresponding to a maximum of a likelihood function;
    (e) accessing a table correlating estimated monopulse ratios and corresponding estimated target angle values and determining from the table the estimated target angle having a value best corresponding to the estimated monopulse ratio;
    (f) accessing a complex target amplitude corresponding to the determined estimated target angle;
    (g) comparing the complex target amplitude corresponding to the determined estimated target angle to a threshold; and
    (h) if, based on the step of comparing, the target amplitude exceeds the threshold, providing an output signal indicative of target detection and the estimated target angle.

2. The method of claim 1 wherein the step of determining the monopulse ratios further comprises calculating a dimensionless ratio of a difference beam to a sum beam.

3. The method of claim 1 wherein said step (d) further comprises employing a monopulse ratio measurement and a ratio of noise statistics of the sum and difference beams to determine the likelihood function.

4. The method of claim 1 wherein said step (e) further uses the monopulse ratio estimate for accessing the complex target amplitude corresponding to the angle estimation.

5. The method of claim 1, wherein said steps (c) through (h) are performed by a processor.

6. The method of claim 1, further comprising displaying the estimated target angle.

7. An apparatus for providing target detection and estimated angle signal, comprising:
    a memory device;
    a processor in communication with the memory device, for executing the steps of:
    based on monopulse beam data, determining monopulse ratios;
    using maximum likelihood estimation based on the determined monopulse ratios to determine a monopulse ratio estimate corresponding to a maximum of a likelihood function;
    accessing a table correlating estimated monopulse ratios and corresponding estimated target angle values and determining from the table the estimated target angle having a value best corresponding to the estimated monopulse ratio;
    accessing a complex target amplitude corresponding to the determined estimated target angle;
    comparing the complex target amplitude corresponding to the determined estimated target angle to a threshold; and
    if, based on the step of comparing, the target amplitude exceeds the threshold, providing an output signal indicative of target detection and the estimated target angle.

8. The apparatus of claim 7 wherein the determination by the processor of the monopulse ratio comprises calculating a dimensionless ratio of a difference beam to a sum beam.

9. The apparatus of claim 7 wherein the determination by the processor of the maximum of the likelihood function comprises employing a monopulse ratio measurement and a ratio of noise statistics of the sum and difference beams.

10. The apparatus of claim 7 wherein the comparing by the processor of the target amplitude of the estimated target angle to the threshold uses a complex target amplitude.

11. The apparatus of claim 7, further comprising a display for displaying the estimated target angle.

12. A radar system, comprising:
    (a) a beamformer for supplying sum beam and difference beam signals; and
    (b) a processor for: (1) receiving the signals; (2) computing monopulse ratios of the sum and difference beams; (3) computing, employing maximum likelihood estimation, a monopulse ratio estimate based on the monopulse ratios; (4) accessing a data storage that associates the monopulse ratio estimate with a corresponding estimated angle value; (5) accessing a complex target amplitude corresponding to the estimated angle value; (6) comparing the complex target amplitude associated with the estimated target angle to a threshold to determine if a target is present; and (7) providing an output signal indicative of the estimated target angle if a target is determined to be present.

13. The radar system of claim 12, further comprising an array antenna having an output coupled to an input of the beamformer.

14. The radar system of claim 12, wherein the data storage includes a table correlating monopulse ratio estimates and corresponding angle values for determining from the table the estimated target angle having a value closest to the monopulse ratio estimate.

* * * * *